(12) United States Patent
Al Mahmood

(10) Patent No.: US 10,823,054 B2
(45) Date of Patent: Nov. 3, 2020

(54) REDUCING THE LOAD CONSUMED BY GAS TURBINE COMPRESSOR AND MAXIMIZING TURBINE MASS FLOW

(71) Applicant: Fuad Al Mahmood, Kingdom of Bahrain (BH)

(72) Inventor: Fuad Al Mahmood, Kingdom of Bahrain (BH)

(*) Notice: Subject to any disclaimer, the term of this patent is extended or adjusted under 35 U.S.C. 154(b) by 268 days.

(21) Appl. No.: 14/392,074

(22) PCT Filed: May 30, 2013

(86) PCT No.: PCT/IB2013/054458
§ 371 (c)(1),
(2) Date: May 31, 2016

(87) PCT Pub. No.: WO2014/072842
PCT Pub. Date: May 15, 2014

(65) Prior Publication Data
US 2016/0376985 A1    Dec. 29, 2016

(51) Int. Cl.
*F02C 3/30* (2006.01)
*F02C 7/143* (2006.01)
*F02C 3/04* (2006.01)
*H02K 7/18* (2006.01)

(52) U.S. Cl.
CPC .......... *F02C 3/305* (2013.01); *F02C 3/04* (2013.01); *F02C 7/1435* (2013.01); *H02K 7/1823* (2013.01); *F05D 2220/32* (2013.01); *F05D 2220/76* (2013.01); *F05D 2260/232* (2013.01); *F05D 2270/16* (2013.01)

(58) Field of Classification Search
CPC .................................. F02C 3/30; F02C 3/305
USPC ............ 290/52; 415/1; 705/7.11; 14/52, 392
See application file for complete search history.

(56) References Cited

U.S. PATENT DOCUMENTS

| 4,571,151 | A  | * | 2/1986  | Paul ..................... F04D 29/5846 415/1 |
| 6,012,279 | A  | * | 1/2000  | Hines ..................... F02C 7/1435 60/39.53 |
| 6,935,831 | B2 | * | 8/2005  | Joshi ....................... F02C 7/143 415/1 |
| 6,966,745 | B2 | * | 11/2005 | Jansohn .................. F02C 7/143 415/1 |
| 7,703,272 | B2 | * | 4/2010  | Wagner ................. F01D 25/002 60/39.53 |
| 7,712,301 | B1 | * | 5/2010  | Wagner ................. F01D 25/002 134/23 |
| 7,835,930 | B2 | * | 11/2010 | Antoine ............... G06Q 10/063 705/7.11 |
| 8,561,412 | B2 | * | 10/2013 | Stevanovic ............... F02C 1/04 60/781 |
| 9,200,983 | B2 | * | 12/2015 | Brostmeyer .......... G01M 15/14 |
| 9,605,559 | B2 | * | 3/2017  | Truesdale ............... F03D 7/047 |
| 10,480,404 | B2 | * | 11/2019 | Puerta .................... F02C 7/1435 |
| 2004/0025513 | A1 | * | 2/2004 | Walsh .................... F02C 3/305 60/775 |

(Continued)

FOREIGN PATENT DOCUMENTS

| EP | 2136051 A2 * | 12/2009 | ............. F02C 3/305 |
| JP | 2003106168 A * | 4/2003 | ............... F02C 7/08 |

*Primary Examiner* — Pedro J Cuevas

(57) ABSTRACT

The invention is applicable to industrial gas turbines to reduce the load consumed by the gas turbine compressor and to maximize the turbine mass flow.

3 Claims, 2 Drawing Sheets

C: Compressor
T: Turbine
C/C: Combustion Chamber
E/H: Water Heater
TC: Temperature Controller

(56) References Cited

U.S. PATENT DOCUMENTS

| | | | | |
|---|---|---|---|---|
| 2004/0177618 A1* | 9/2004 | Placko | F02C 3/305 60/775 |
| 2005/0095117 A1* | 5/2005 | Joshi | F02C 7/143 415/1 |
| 2006/0253268 A1* | 11/2006 | Antoine | G06Q 10/063 702/184 |
| 2007/0251210 A1* | 11/2007 | Ceric | F01D 25/002 60/226.1 |
| 2008/0250769 A1* | 10/2008 | Wagner | F01D 25/002 60/39.24 |
| 2009/0226295 A1* | 9/2009 | Haertel | F02C 3/30 415/1 |
| 2009/0314005 A1* | 12/2009 | Messmer | F02F 1/4292 60/792 |
| 2011/0210555 A1* | 9/2011 | Xia | F01K 13/02 290/52 |
| 2012/0070266 A1* | 3/2012 | Schaberg | F01D 21/12 415/1 |
| 2012/0137701 A1* | 6/2012 | Stevanovic | F02C 1/04 60/781 |
| 2013/0028707 A1* | 1/2013 | Puerta | F02C 3/305 415/1 |
| 2014/0053641 A1* | 2/2014 | Brostmeyer | G01M 15/14 73/112.01 |
| 2014/0090353 A1* | 4/2014 | Simons | F02C 9/00 60/39.5 |
| 2015/0240719 A1* | 8/2015 | Kraft | F02C 6/00 290/52 |
| 2016/0222820 A1* | 8/2016 | Truesdale | F03D 7/047 |
| 2017/0207628 A1* | 7/2017 | Zhang | H02J 3/14 |

* cited by examiner

C: Compressor
T: Turbine
C/C: Combustion Chamber
E/H: Water Heater
TC: Temperature Controller

REDUCING THE LOAD CONSUMED BY GAS TURBINE COMPRESSOR AND MAXIMIZING TURBINE MASS FLOW

CROSS REFERENCE TO RELATED APPLICATION

This application is a national stage entry of PCT/IB2013/054458 filed May 30, 2013, under the International Convention claiming priority over European Union Patent Application No. GC 2012-22727 filed Nov. 6, 2012.

TECHNICAL FIELD

This invention is applicable to industrial gas turbines, and looking into reducing the load consumed by gas turbine COMPRESSOR and maximizing turbine MASS FLOW.

BACKGROUND ART

Improving gas turbines overall efficiency efforts have no limit, and more efforts are taking placed in this field, as this will lead to increase in power generated by gas turbine and reduces fuel consumption for that power.

The main problem avoiding gas turbine overall efficiency improvement is that, air compressor alone consumes most of the power being generated by the turbine. Moreover gas turbine air mass flow cannot be maximized without increasing compressor load consumption.

SUMMARY OF THE INVENTION

From example below and from steam table, it can be seen that air at compressor outlet is superheated. Excess superheating increases compressor load consumption. Therefore reducing compressor air outlet temperature and pressure safely above saturation point before leaving the compressor will reduce compressor load consumption, and will increase gas turbine overall efficiency. This can be done by injection high pressure water relatively cold into air compressor as shown in FIG. 1.

Moreover, gas turbine mass flow rate can be maximized by increasing the temperature of the high pressure water being injected into the compressor as shown in the example. Increase in gas turbine mass flow will further increase gas turbine overall efficiency.

DETAILED DESCRIPTION OF THE DRAWINGS

Figure 1:
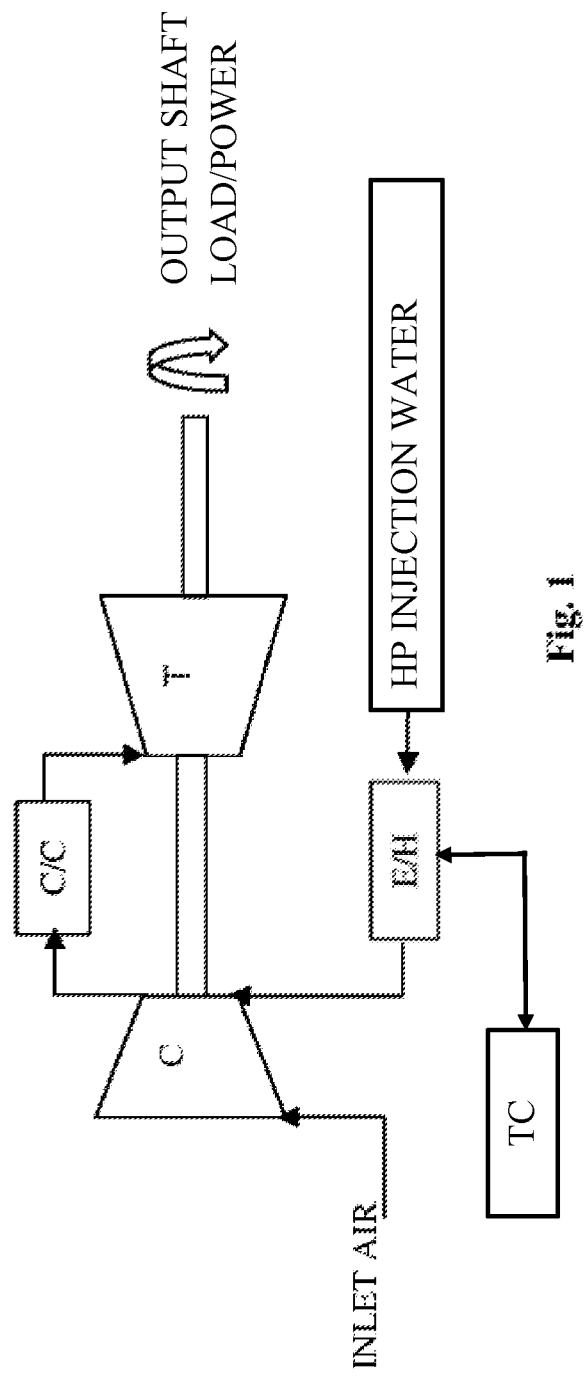
FIG. 1 shows a schematic view of the system of the present invention including a gas turbine main parts, air compressor, combustion chamber, turbine, electrical generator, and high pressure water injection system.

FIG. 1 shows gas turbine main parts and contains, an air compressor (C), a combustion chamber (C/C), a turbine (T), a temperature adjustment means (E/H) and, a high pressure water injection system (HP Injection water).

For the invention implementation the High-pressure water is introduced into the gas turbine (T). The temperature controlling device (E/H) is connected to the high pressure injection system (HP Injection water). The temperature controlling means controls the temperature of the water being injected into the compressor (C).

Figure 2:
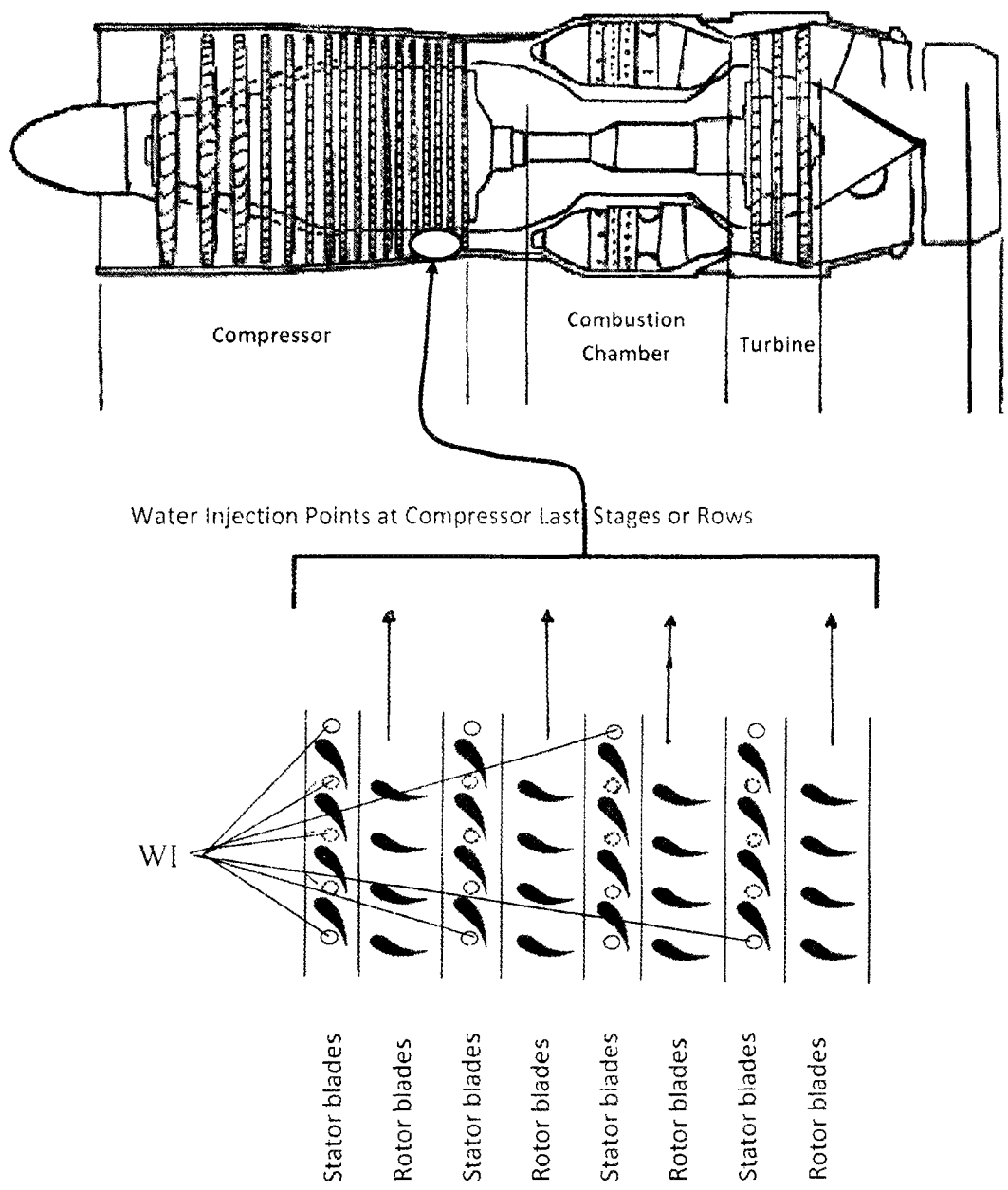

FIG. 2 shows the water injection WI high pressure nozzles at and between the blades of the last stages or rows near the outlet of an exemplary turbine Compressor according to one embodiment of the present invention.

DESCRIPTION OF ONE SPECIFIC EXAMPLE OR EMBODIMENT OF THE INVENTION

For a Gas turbine having the followings:—
T1: Compressor-air inlet temperature ° K=283° K
T2: Compressor-air outlet temperature ° K=547° K
P2: compressor air outlet pressure=12 bar
T3: Gas turbine inlet temperature ° K=1258° K
T4: Gas turbine outlet temperature ° K=768° K
$\eta ad$: adiabatic efficiency Calculation $1^{st}$: improving gas turbine efficiency by reducing energy consumed by air compressor.

From steam table the following can be extracted:
Water vapor at 12 bar and compressor outlet temperature of (274° C.)=547° K is in the superheated zone.
Saturation Temperature=192° C.=465° K
Degree of Superheat=547−465=82 degree Therefore compressor air outlet temperature can be reduced by 70 degrees from 547° K to 477° K without de-superheating it.

$$\text{Turbine adiabatic efficiency } \eta ad = 1-(T4-T1)/(T3-T2) \quad \text{(Brighton cycle)}$$

The adiabatic efficiency of the gas turbine $\eta ad=32\%$

Table below shows the improvement in the adiabatic efficiency from 32% to 38% in relation to drop in compressor outlet temperature from 547° K to 477° K.

| | T2 ° K | | | | | | | |
|---|---|---|---|---|---|---|---|---|
| | 547 | 537 | 527 | 517 | 507 | 497 | 487 | 477 |
| $\eta ad$ % | 32 | 33 | 34 | 35 | 35 | 36 | 37 | 38 |

$2^{nd}$: Improvement gas turbine overall efficiency by increasing turbine mass flow.

From gas turbine overall thermal efficiency equation where $\eta t$: Turbine thermal efficiency
Wt: Work done by gas turbine=(Ma+Mf) (h3−h4)
Wc: Load consumed by compressor=Ma (h2−h1)
h: air specific heat
Ma: Air mass flow rate from compressor
Mf: Fuel mass
Mw: Mass of high pressure water injected in compressor $$\eta t=[(Wt-Wc)/Wt]\times 100=1-[Ma(h2-h1)/Ma+Mw+Mf(h3-h4)]\times 100$$

From the above equation it can be seen that the increase in injected water mass (Mw) will increase gas turbine overall efficiency.

$3^{rd}$: Improving gas turbine overall efficiency by maximizing turbine mass flow.

From fluid mixture equation $$Taw=(Ma\ Ta+Mw\ Tw)/(Ma+Mw)$$

Therefore $Mw=Ma(Ta-Taw)/(Taw-Tw)$

Where:—
Taw: Required air water mixture temperature=477° K
Ta: Compressor air outlet temperature=547° K Tw: Injected water temperature=288° K Mw/Ma=Water mass to air mass Therefore the required mass of high pressure water injected to reduce compressor outlet temperature from 547° K to 477° K is Mw=0.37 Ma.

The below table shows the increase in injected water mass rate in relation to air mass flow rate corresponding to increase in injected water inlet temperature.

| Tw ° K | | | | | | | | |
|---|---|---|---|---|---|---|---|---|
| 288 | 300 | 350 | 400 | 450 | 460 | 470 | 475 | 477 |
| Mw/Ma | | | | | | | | |
| 0.37 | 0.40 | 0.55 | 0.91 | 2.59 | 4.11 | 10 | 35 | Infinity |

The invention claimed is:

1. A process for injecting water into the compressor of a gas turbine, comprising the steps of:
    injecting high pressure water into an outlet of a compressor to provide superheated outlet air, with the temperature and pressure of the outlet air of the compressor is reduced above a saturation point;
    wherein the high pressure water is injected by using injectors located only at air compressor last stages between stationary blades or only at last rows between stationary blades, and the high pressure nozzles are connected to a high pressure water injection system.

2. A process for injecting water into the compressor of a gas turbine, comprising the steps of:
    injecting high pressure water into an outlet of a compressor to provide superheated outlet air, with the temperature and pressure of the outlet air of the compressor is reduced above a saturation point; and
    adjusting the temperature of the injected high pressure water by using a temperature adjusting means;
        wherein the high pressure water is injected by using injectors located only at air compressor last stages between stationary blades or only at last rows between stationary blades, and the high pressure nozzles are connected to a high pressure water injection system.

3. The process of claim 2, wherein said injecting high pressure water comprises injecting high pressure water within a range of temperature from atmospheric temperature up to compressor outlet air saturation point temperature into said compressor outlet air.

* * * * *

UNITED STATES PATENT AND TRADEMARK OFFICE
CERTIFICATE OF CORRECTION

| | | |
|---|---|---|
| PATENT NO. | : 10,823,054 B2 | Page 1 of 1 |
| APPLICATION NO. | : 14/392074 | |
| DATED | : November 3, 2020 | |
| INVENTOR(S) | : Fuad Al Mahmood | |

It is certified that error appears in the above-identified patent and that said Letters Patent is hereby corrected as shown below:

On the Title Page

Below Item (87) insert:
--(30) Foreign Application Priority Data
November 6, 2012 EM GC 2012-22727--

Signed and Sealed this
Eighteenth Day of November, 2025

John A. Squires
*Director of the United States Patent and Trademark Office*